US012624758B2

(12) United States Patent
Gundlach et al.

(10) Patent No.: US 12,624,758 B2
(45) Date of Patent: May 12, 2026

(54) METHOD FOR OPERATING A MOTOR VEHICLE DRIVE TRAIN DEVICE FOR A MOTOR VEHICLE AND CORRESPONDING MOTOR VEHICLE DRIVE TRAIN DEVICE

(71) Applicant: AUDI AG, Ingolstadt (DE)

(72) Inventors: Lutz Gundlach, Ingolstadt (DE); Jürgen Kiesewetter, Weißenburg i.B (DE); Enrico Szeppat, Lunzenau OT Görizhain (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 19/118,013

(22) PCT Filed: Sep. 29, 2023

(86) PCT No.: PCT/EP2023/077169
§ 371 (c)(1),
(2) Date: Apr. 3, 2025

(87) PCT Pub. No.: WO2024/074434
PCT Pub. Date: Apr. 11, 2024

(65) Prior Publication Data
US 2026/0009469 A1 Jan. 8, 2026

(30) Foreign Application Priority Data
Oct. 6, 2022 (DE) .......................... 102022125811.4

(51) Int. Cl.
| *F16H 63/48* | (2006.01) |
| *F16H 63/34* | (2006.01) |
| *F16H 63/50* | (2006.01) |

(52) U.S. Cl.
CPC ............. *F16H 63/48* (2013.01); *F16H 63/50* (2013.01); *F16H 63/3416* (2013.01)

(58) Field of Classification Search
CPC ....... F16H 63/3416–3491; F16H 63/48; F16H 63/483; F16H 63/50
See application file for complete search history.

(56) References Cited

U.S. PATENT DOCUMENTS

| 10,053,098 B2 * | 8/2018 | Feiner ................... B60W 10/02 |
| 10,571,023 B2 * | 2/2020 | Neelakantan ........... F16H 63/50 |

FOREIGN PATENT DOCUMENTS

| DE | 102009030084 A1 | 12/2010 |
| DE | 102010011557 A1 | 9/2011 |

(Continued)

OTHER PUBLICATIONS

International Search Report issued on Jan. 18, 2024, in corresponding International Application No. PCT/EP2023/077169, 7 pages.

(Continued)

*Primary Examiner* — James J Taylor, II
(74) *Attorney, Agent, or Firm* — Maier & Maier, PLLC

(57) ABSTRACT

A method for operating a motor vehicle drive train device for a motor vehicle, which includes a motor, connected at least temporarily to at least one wheel of the motor vehicle via a torque transmission assembly, and a park lock device. The park lock device form-fittingly fixes a locking element coupled in a rotationally fixed manner to the torque transmission assembly in a first setting and releases in a second setting and, when the park lock device is switched from the first setting to the second setting, a compensating torque is generated on the locking element by the motor, which compensating torque counteracts a tensioning torque by a tensioning of the torque transmission assembly when the locking element is fixed. The compensating torque is determined from a torsional angle of the torque transmission assembly determined after fixing of the locking element and a torsional stiffness of the torque transmission assembly.

20 Claims, 2 Drawing Sheets

(56)     References Cited

FOREIGN PATENT DOCUMENTS

| | | |
|---|---|---|
| DE | 102015217975 A1 | 3/2017 |
| DE | 102019113390 A1 | 1/2020 |
| DE | 102019219670 A1 | 6/2021 |
| DE | 112018004616 B4 | 7/2021 |

OTHER PUBLICATIONS

Written Opinion issued on Jan. 18, 2024, in corresponding International Application No. PCT/EP2023/077169, 10 pages.

* cited by examiner

METHOD FOR OPERATING A MOTOR VEHICLE DRIVE TRAIN DEVICE FOR A MOTOR VEHICLE AND CORRESPONDING MOTOR VEHICLE DRIVE TRAIN DEVICE

FIELD

The invention relates to a method for operating a motor vehicle drive train device for a motor vehicle, which comprises a motor, connected at least temporarily to at least one wheel of the motor vehicle via a torque transmission assembly, and a park lock device, wherein the park lock device form-fittingly fixes a locking element coupled in a rotationally fixed manner to the torque transmission assembly in a first setting and releases it in a second setting and, when the park lock device is switched from the first setting to the second setting, a compensating torque is generated on the locking element by means of the drive unit, which compensating torque counteracts a tensioning torque caused by a tensioning of the torque transmission assembly when the locking element is fixed. The invention also relates to a motor vehicle drive train device for a motor vehicle.

BACKGROUND

Publication DE 10 2010 011 557 A1, for example, is known from the state of the art. This describes a motor vehicle drive train device with a park lock device, which is provided to at least partially form-fittingly lock a motor vehicle drive train, and with a control and/or regulating unit, which is provided to set a defined drive torque in at least one operating state. It is provided that the control and/or regulating unit is intended to set a compensation drive torque provided for reducing a drive train tensioning torque in order to release the park lock device.

Furthermore, the publication DE 10 2019 219 670 A1 discloses a transmission device for a motor vehicle, comprising a park lock device which is configured to lock a moving element of the transmission device at least temporarily and/or as required in an engaged state of the park lock device and to release it in a disengaged state of the park lock device, wherein the transmission device is configured for this purpose, to generate a defined torque by means of an electric machine assigned to the transmission device in order to deploy the park lock device, wherein the transmission device is configured to cancel a coupling of a locking element of the transmission device to the corresponding element to be locked by generating the defined torque, wherein the park lock device is configured to transfer at least one locking element into the deployed state when the defined torque is present.

SUMMARY

The objective of the invention is to propose a method for operating a motor vehicle drive train device for a motor vehicle which comprises advantages over known methods, in particular determines the equalising torque with high accuracy, so that a jolting release of the torque transmission assembly is avoided when the park lock device is released, that is, when the locking element is released by the park lock device.

According to the invention, this is achieved with a method for operating a motor vehicle drive train device for a motor vehicle. It is provided that the compensating torque is determined from a torsional angle of the torque transmission assembly determined after fixing of the locking element and a torsional stiffness of the torque transmission assembly.

It should be noted that the exemplary embodiments explained in the description are not limiting; rather, any variations of the features disclosed in the description, the claims and the figures can be realised.

The method described is used to operate the motor vehicle drive train device. The motor vehicle drive train device is preferably a component of the motor vehicle, but can of course also be present separately from it. The motor vehicle drive train device is used for establishing, at least temporarily, a drive connection between the wheel of the motor vehicle and a drive device of the motor vehicle. The drive device is used to drive the motor vehicle, in this respect therefore to provide a drive torque directed towards driving the motor vehicle. To provide the drive torque, the drive device comprises at least one drive unit, which is configured, for example, as an internal combustion engine or as an electric machine or electric traction machine.

The drive device is at least temporarily connected to the at least one wheel of the motor vehicle via the torque transmission assembly of the motor vehicle drive train device, so that a torque, in particular the drive torque, is transmitted between the drive device and the wheel. The torque transmission assembly is any arrangement by means of which the torque can be transmitted between the drive device and the wheel of the motor vehicle. In the simplest case, the torque transmission assembly is a shaft. Particularly preferably, the torque transmission assembly comprises a gearbox by means of which different gears or ratios can be set between the drive unit and the wheel.

In addition to the torque transmission assembly, the vehicle drive train device comprises the engine. The motor is preferably a component of the drive device already mentioned, so that in this case the motor vehicle drive train device is also a component of the drive device of the motor vehicle. Particularly preferably, the motor corresponds to the drive unit of the drive device, in particular the electric traction machine. Alternatively, however, the motor can also be located away from the drive device and be configured as a separate electric machine, for example.

Furthermore, the park lock device is a component of the vehicle drive train device. The park lock device is used to lock the torque transmission assembly by temporarily fixing the locking element, which is coupled to the torque transmission assembly in a rotationally fixed manner. The locking element is preferably permanently connected to the wheel via the torque transmission assembly. For example, the locking element is in the form of a parking ratchet wheel, such as a pawl wheel, claw clutch wheel or gearwheel, which is rigidly connected to a shaft of the torque transmission assembly.

The motor vehicle can be fixed at a standstill by means of the park lock device. The park lock device is activated when the motor vehicle is stationary and blocks the torque transmission assembly in such a way that the wheel of the motor vehicle is also fixed. For this purpose, in the first setting of the park lock device, a blocking element engages form-fittingly with the blocking element or interacts form-fittingly with the blocking element in order to fix it and prevent the blocking element from rotating accordingly. In the second setting of the park lock device, however, the blocking element releases the locking element so that the locking element can move or rotate freely and consequently the wheel of the motor vehicle is also released.

If the motor vehicle is parked on a slope, for example, a torque acts on the wheel of the motor vehicle even after the locking element has been fixed, which is also exerted on the locking element due to the connection between the wheel and the locking element. This causes the torque transmission assembly to be tensioned with the tensioning torque. The tensioning torque corresponds in particular to the torque that is exerted on the wheel due to the influence of gravity on the motor vehicle and the resulting downhill force as well as the coefficient of adhesion between the wheel and its contact surface or a surface.

The wheel of the motor vehicle is located in particular on a first wheel axis of the motor vehicle. Preferably, the motor vehicle has a parking brake or hand brake, in particular an electronic parking brake. The parking brake is used in particular to fix at least one wheel of at least one wheel axis of the motor vehicle, in particular a second wheel axis of the motor vehicle, preferably all wheels of the respective wheel axis, in particular when the motor vehicle is stationary. The first wheel axis is present, for example, as the front wheel axis and the second wheel axis as the rear wheel axis or vice versa. If the parking brake is set to fix the respective wheel axis, this can influence the tensioning torque, in particular reduce its absolute value.

The tensioning torque acts between the locking element and the blocking element. When the park lock device is released, that is, when changing from the first setting to the second setting, the park lock device must overcome the tensioning torque in order to end the form-fittingly fixing of the locking element. On the one hand, this means that the park lock device must be sufficiently dimensioned to be able to reliably release the locking element even with large tensioning torques. On the other hand, depending on the size of the tensioning torque, undesirable noise and/or jolting of the motor vehicle can occur when the park lock device is released.

To avoid this, it is provided that when the park lock device is switched from the first setting to the second setting, the compensating torque is generated on the locking element by means of the motor. The compensating torque is selected in such a way that it counteracts the tensioning torque which has occurred due to the tensioning of the torque transmission assembly when the locking element is fixed. The compensating torque to be effected by the motor can, for example, be determined as a function of an angle of inclination of the motor vehicle.

However, this is often not accurate enough. If, for example, the motor vehicle is parked in such a way that the wheel is on a kerb, a tensioning torque can occur which differs significantly from that which would be caused by the angle of inclination of the motor vehicle alone. For this reason, it is provided to determine the compensating torque in a different way, in particular independent of the angle of inclination of the motor vehicle.

The torsional angle of the torque transmission assembly and its torsional stiffness are used here. The torsional angle describes the angle by which the torque transmission assembly is rotated or has been rotated after the locking element has been fixed. The compensating torque can be determined directly on the basis of the torsional angle and the known torsional stiffness of the torque transmission assembly. The torsional stiffness is described, for example, by the directional torque, which represents a proportionality constant between the compensating torque and the torsional angle. In this case, the compensating torque results from a multiplication of the directional torque describing the torsional stiffness and the torsional angle. The torsional stiffness or the directional torque is determined, preferably measured, on a test bench, for example. The measured torsional stiffness is preferably stored in a control device of the vehicle drive train device or the motor vehicle. The torsional stiffness is preferably stored constantly, that is, it is unchanging at least during operation of the motor vehicle.

The torsional angle of the torque transmission assembly is determined at a torsional angle determination location. In principle, the torsional angle determination location can be selected at will, for example it is located on the wheel or a wheel carrier on which the wheel is mounted or can be mounted. When determining the compensating torque, the torsional stiffness of the torque transmission assembly between the torsional angle determination location and the locking element is of course taken into account in order to determine the compensating torque with high accuracy. Using the procedure described, the tensioning torque can be equalised or at least almost equalised under numerous boundary conditions using the motor, so that the locking element can be released with little effort and without any disruptive side effects.

An embodiment of the invention provides that the torque transmission assembly comprises a gearbox, in particular a gear change gearbox, and that a gearbox or gear change gearbox comprising the park lock device is used as the gearbox or gear change gearbox. In other words, the park lock device is a component of the gearbox and the gearbox in turn is a component of the torque transmission assembly and thus of the vehicle drive train device. The gearbox can be a gearbox with an invariable and constant transmission ratio. There is therefore always the same transmission ratio between a gearbox input shaft and a gearbox output shaft of the gearbox and thus between the drive device and the wheel of the motor vehicle.

However, the gearbox can also be configured as a gear change gearbox. The gearbox is used to set different gears or ratios between the drive device and the wheel of the motor vehicle. For this purpose, a gear is selected from the gears of the gear change gearbox and set on the gear change gearbox so that the transmission ratio corresponding to the gear is present between the drive device and the wheel.

Preferably, the input shaft of the gearbox is connected to the drive device, in particular via a starting clutch. The output shaft of the gearbox is preferably rigidly and permanently connected to the wheel of the motor vehicle. The locking element is also assigned to the gearbox, for example it is rigidly arranged and attached to the output shaft. When generating the compensating torque by means of the motor, the transmission ratio present via the gearbox or the transmission ratio set on the gearbox is of course taken into account. This means that the engine provides an engine torque which is converted into the compensating torque using the gearbox and its transmission ratio or using the gearbox and the transmission ratio set on it. The configuration described enables simple implementation of the method according to this description.

An embodiment of the invention provides that the torsional angle is measured by means of a torsional pulse generator. The torsional pulse generator is an incremental generator by means of which a rotational movement or its extent can be determined. A rotational movement of the torque transmission assembly causes one or more torsional pulses to be generated by the torsional pulse generator, wherein each of the torsional pulses corresponds to a certain torsional angle difference. In this respect, the torsional angle results from the number of torsional pulses generated by the torsional pulse generator and the torsional angle difference. This achieves the advantages already explained.

An embodiment of the invention provides that a torsional pulse generator measuring a rotational speed of the wheel is used as the torsional pulse generator. In this respect, the torsional pulse generator is present, for example, as a wheel sensor, preferably as a wheel speed sensor. In particular, it is arranged on a wheel hub, which is part of the vehicle drive train device and via which the wheel of the motor vehicle can be coupled to the drive system. Measuring the rotational speed of the wheel or the torsional angle of the wheel enables the compensating torque to be determined particularly accurately.

An embodiment of the invention provides that a longitudinal acceleration of the motor vehicle is also taken into account when determining the compensating torque. The longitudinal acceleration is used in particular if the torsional pulse generator does not provide any information about the direction of rotation of the torque transmission assembly at the torsional angle determination location. The longitudinal acceleration is then used to determine the direction of rotation and to determine whether the angular momentum causes an increase or decrease in the tensioning torque and correspondingly the compensating torque. In particular, the longitudinal acceleration is used to determine the sign of the tensioning torque and thus the compensating torque, thus enabling a particularly accurate determination of the compensating torque. The longitudinal acceleration is preferably measured using an acceleration sensor. The acceleration sensor is particularly preferably part of an ESP system and is therefore already part of the vehicle drive train device or the motor vehicle.

An embodiment of the invention provides that a torsional angle difference between a first torsional angle of the torque transmission assembly provided when the locking element is fixed and a second torsional angle of the torque transmission assembly provided before the locking element is released is used as the torsional angle. The torsional angle builds up over time after fixing the locking element. This will usually take place over a comparatively short period of time, namely from the fixing of the locking element until the motor vehicle comes to a complete standstill. In this respect, the torsional angle is present in the form of the torsional angle difference between the first torsional angle and the second torsional angle.

The torque transmission assembly is at the first torsional angle when the locking element is fixed or immediately after it is fixed. The second torsional angle of the torque transmission assembly is subsequently set over time. It may be provided that the second torsional angle is determined a certain period of time after the first torsional angle is determined and the torsional angle is calculated. For example, the second torsional angle is determined as soon as the motor vehicle has come to a standstill. However, it is particularly preferable for the second torsional angle to be determined immediately before the locking element is released in order to determine the torsional angle difference and consequently the torsional angle with particularly high accuracy. In this case, the torsional angle that has built up over the entire period of time between the locking element being fixed and its release is recorded.

An embodiment of the invention provides that the determination of the torsional angle is carried out from the fixing of the locking element until immediately before the release of the locking element. This procedure has already been mentioned. It enables the torsional angle to be determined with particularly high accuracy.

An embodiment of the invention provides that the torsional angle is determined integrally from a signal of the torsional pulse generator and the longitudinal acceleration. As already explained, the signal from the torsional pulse generator comprises one or more rotary pulses. Based on these and a torsional angle difference assigned to the rotary pulses, the torsional angle can be determined integrally, that is, by summing. The sign of each summand, corresponding to the torsional angle difference, is determined using the longitudinal acceleration. In this respect, the longitudinal acceleration provides an indication of whether the torsional angle increases or decreases by the torsional angle difference when the angular momentum occurs. This also achieves the aforementioned advantages.

An embodiment of the invention provides that, when a control device that determines the torsional angle is switched off with the locking element fixed, an instantaneous value of the torsional angle is stored and, when the control device is switched on, the determination of the torsional angle is continued on the basis of the stored value. The control device is part of the vehicle drive train device. It is usually switched off after a certain period of time has elapsed after the motor vehicle has been switched off or parked. The switched-off control device no longer monitors changes in the torsional angle or no longer evaluates the torsional pulses generated by the torsional pulse generator. Nevertheless, the torsional angle determined until the control device is switched off should be retained in order to be able to provide the compensating torque with high accuracy when the locking element is released.

For this reason, the current value of the torsional angle is stored when the control device is switched off. In other words, the current value of the torsional angle is stored if the control device is switched off while the locking element is fixed. If the control device is switched on again later—with the locking element still fixed—the determination of the holding angle is continued on the basis of the stored value. In particular, this means that the compensating torque is determined on the basis of the stored value if the motor is to be or is being controlled to generate the compensating torque. In addition, a change in the torsional angle that occurs after the control device is switched on again and before the locking element is released is preferably taken into account. The procedure described has the advantage that the value already determined for the torsional angle is retained, so that the motor can be controlled in a targeted manner to generate the compensating torque when the locking element is released.

The invention further relates to a vehicle drive train device for a motor vehicle, in particular for carrying out the method according to the embodiments within the scope of this description, wherein the vehicle drive train device comprises a motor, connected at least temporarily to at least one wheel of the motor vehicle via a torque transmission assembly, and a park lock device, wherein the park lock device form-fittingly fixes a locking element coupled in a rotationally fixed manner to the torque transmission assembly in a first setting and releases it in a second setting and, when the park lock device is switched from the first setting to the second setting, a compensating torque is generated on the locking element by means of the motor, which compensating torque counteracts a tensioning torque caused by a tensioning of the torque transmission assembly when the locking element is fixed. The vehicle drive train device is provided and configured to determine the compensating torque from a torsional angle of the torque transmission assembly determined after fixing of the locking element and a torsional stiffness of the torque transmission assembly.

The advantages of such a configuration of the vehicle drive train device and the procedure explained have already been described. Both the vehicle drive train device and the method for operating it can be further developed in accordance with the explanations within the scope of this description, so that reference is made to them in this respect.

The features and combinations of features described in the description, in particular the features and combinations of features described in the following description of the figures and/or shown in the figures, can be used not only in the combination indicated in each case, but also in other combinations or on their own, without departing from the scope of the invention. Thus, embodiments which are not explicitly shown or explained in the description and/or the figures, but which emerge from the explained embodiments or can be derived from them, are also to be regarded as being covered by the invention.

BRIEF DESCRIPTION OF THE FIGURES

The invention is explained in more detail below with reference to the exemplary embodiments shown in the drawings, without limiting the invention. It shows.

DETAILED DESCRIPTION

Figure 1:
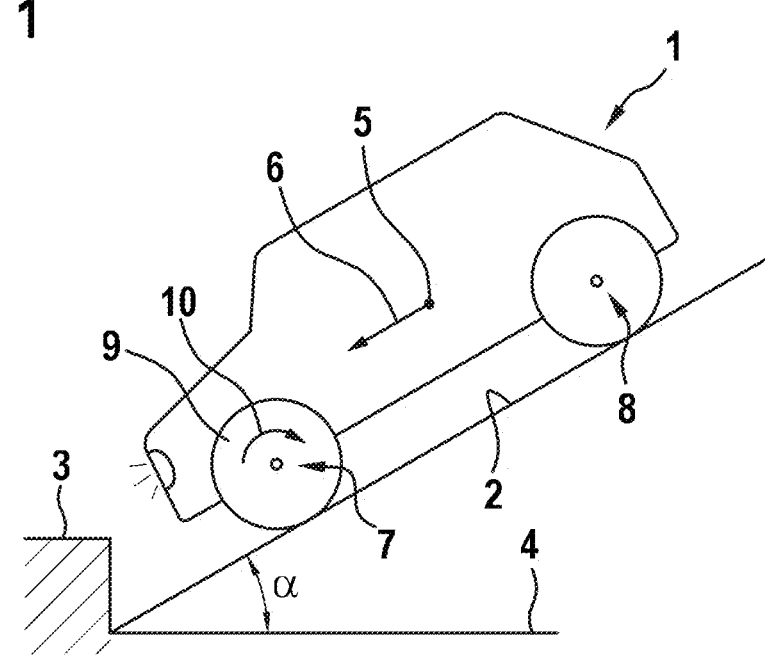
FIG. 1 a schematic representation of a motor vehicle in a first parking situation, FIG. 2 a diagram in which a curve of a signal from a torsional pulse generator and a curve of a longitudinal acceleration of the motor vehicle over time are plotted for the first parking situation, FIG. 3 a schematic representation of the motor vehicle in a second parking situation, and FIG. 4 a diagram in which the curve of the torsional pulse generator signal and the curve of the longitudinal acceleration for the second parking situation are plotted against time.

FIG. 1 shows a schematic representation of a motor vehicle 1 in a first parking situation, in which the motor vehicle 1 is parked on a sloping surface 2 at a distance from a kerb 3. The surface 2 has an angle α with respect to a geodetically horizontal plane 4. This means that a longitudinal acceleration, which is indicated by the arrow 6 and depends on the gravitational force acting on the motor vehicle 1 and the angle α, acts on the motor vehicle 1 starting from a centre of gravity 5 of the motor vehicle 1.

The motor vehicle 1 has several wheel axles 7 and 8, wherein the wheel axle 7 is a front wheel axle and the wheel axle 8 is a rear wheel axle. In the exemplary embodiment shown here, the wheel axis 7 is a driven wheel axis, at least one wheel 9 present on it is correspondingly connected to a drive device not shown here. The drive device is coupled at least temporarily to the wheel 9 via a torque transmission assembly of a vehicle drive train device, which is also not shown.

The torque transmission assembly has a locking element which can be fixed form-fittingly by means of a park lock device, namely in a first setting of the park lock device. In a second setting of the park lock device, however, the locking element is released. After the motor vehicle 1 has been parked and the locking element has been fixed by means of the park lock device, a tensioning torque acts on the wheel 9, which is caused by the longitudinal acceleration indicated by the arrow 6.

In order to facilitate the release of the locking element, a compensating torque should therefore be generated by means of a motor, which is preferably part of the drive device and in particular is present as an electric machine, which counteracts the tensioning torque. This compensating torque is determined after fixing the locking element by determining a torsional angle of the torque transmission assembly. The compensating torque is calculated from the torsional angle using a known torsional stiffness of the torque transmission assembly.

Figure 2:
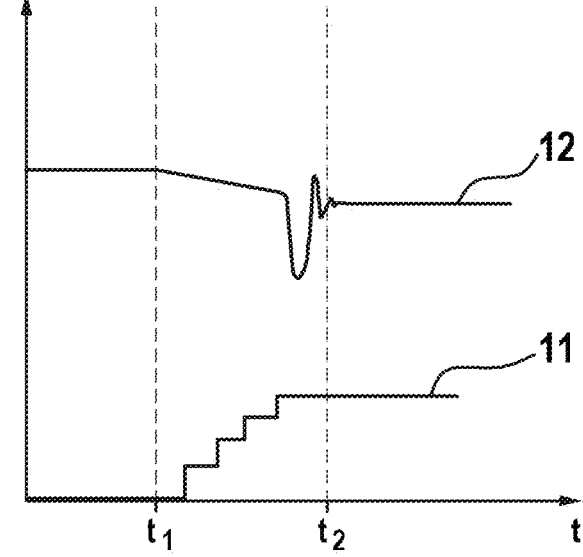

FIG. 2 shows a diagram in which curves 11 and 12 are plotted over time. The curve 11 shows a signal from a torsional pulse generator, which is assigned to the wheel 9. The curve 11 therefore describes a rotational movement of the wheel 9 before, during and after fixing of the locking element. At a point in time $t_1$, the locking element is fixed. Subsequently, the motor vehicle 1 moves slightly further due to the gravitational force acting on it, namely until the time $t_2$ is reached. This is shown in the curve 11, which indicates several torsional pulses of the torsional pulse generator and correspondingly a distance travelled by the wheel 9. The curve 12 shows the corresponding longitudinal acceleration of the motor vehicle 1.

Figure 3:
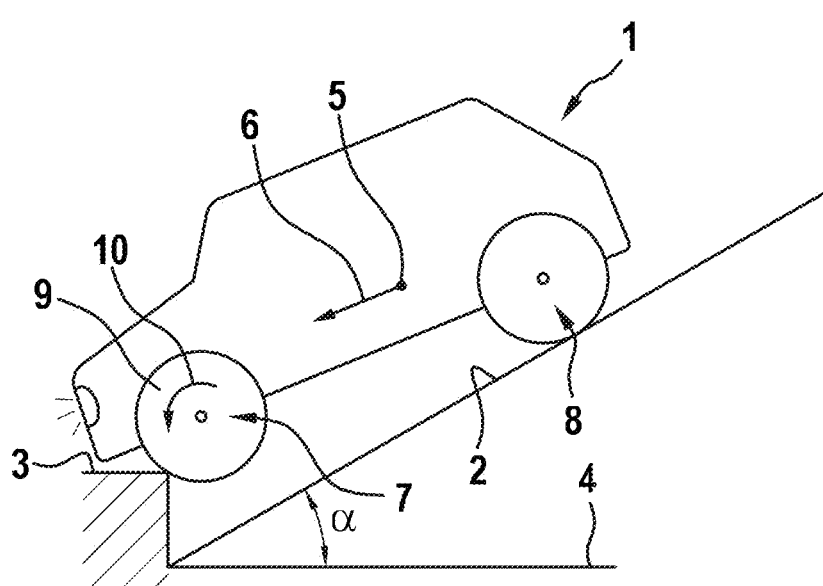

FIG. 3 shows the motor vehicle 3 in a second parking situation. In this situation, the motor vehicle 1 is parked in such a way that the wheel 9 is resting on a kerb edge of the kerb 3. This means that the longitudinal acceleration indicated by the arrow 6 and exerted by gravity on the motor vehicle 1 is similar to that in the first parking situation. However, the torque acting on the wheel 9, which is indicated by the arrow 10, curves in the opposite direction, namely due to the wheel contact force and the resulting effective lever arm at the wheel contact point of the kerb. If the compensating torque is determined solely on the basis of the angle α or the inclination of the surface 2, this could not be taken into account and could lead to an incorrect value of the compensating torque.

Figure 4:
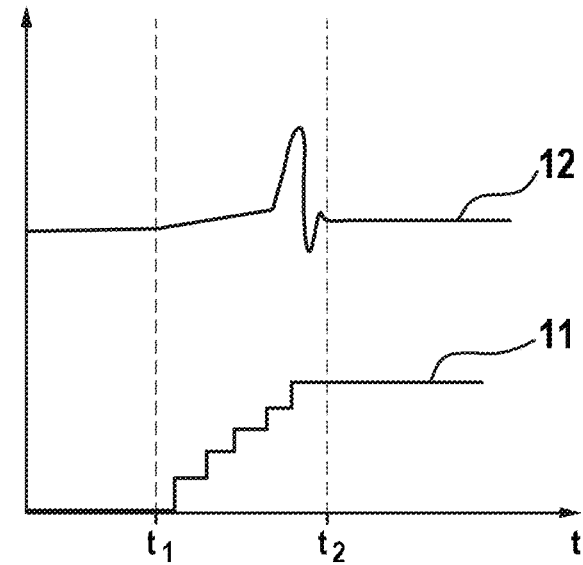

FIG. 4 shows a diagram in which the curves 11 and 12 are again shown, namely for the second parking situation. It is clear from the curve 11 that the tensioning torque is similar to that for the first parking situation, as a similar number of angular momentums occur. However, the sign of the tensioning torque and thus the required compensating torque is exactly the opposite, as indicated by the arrow 10. For this reason, not only the torsional angle of the torque transmission assembly is used to determine the compensating torque, but also the longitudinal acceleration of the motor vehicle 1 according to curve 12, which describes the direction of displacement of the motor vehicle 1 during the torsion of the torque transmission assembly.

The procedure described enables the compensating torque required to release the torque transmission assembly to be determined extremely accurately. The release of the locking element by the park lock device is thus possible with a high level of comfort for the occupants of the motor vehicle.

LIST OF REFERENCE SIGNS

1 Motor vehicle
2 Surface
3 Kerb
4 Plane
5 Centre of gravity
6 Arrow
7 Wheel axis
8 Wheel axis
9 Wheel
10 Arrow
11 Curve
12 Curve

The invention claimed is:

1. A method for operating a motor vehicle drive train device for a motor vehicle, which has a motor, which is connected at least temporarily to at least one wheel of the motor vehicle via a torque transmission assembly, and a park lock device, wherein the park lock device form-fittingly fixes a locking element coupled in a rotationally fixed manner to the torque transmission assembly in a first setting and releases it in a second setting and, when the park lock device is switched from the first setting to the second setting, a compensating torque is generated on the locking element by means of the motor, which counteracts a tensioning torque caused by a tensioning of the torque transmission assembly when the locking element is fixed, wherein the compensating torque is determined from a torsional angle of the torque transmission assembly determined after the locking element has been fixed and a torsional stiffness of the torque transmission assembly.

2. The method according to claim 1, wherein the torque transmission assembly comprises a gearbox that comprises the park lock device.

3. The method according to claim 2, wherein the torsional angle is measured by a torsional pulse generator.

4. The method according to claim 2, wherein a torsional pulse generator measuring a rotational speed of the wheel is used as the torsional pulse generator.

5. The method according to claim 2, wherein a longitudinal acceleration of the motor vehicle is additionally taken into account when determining the compensating torque.

6. The method according to claim 2, wherein a torsional angle difference between a first torsional angle of the torque transmission assembly present when the locking element is fixed and a second torsional angle of the torque transmission assembly present before the locking element is released is used as the torsional angle.

7. The method according to claim 1, wherein the torsional angle is measured by a torsional pulse generator.

8. The method according to claim 7, wherein the torsional pulse generator measuring a rotational speed of the wheel is used as the torsional pulse generator.

9. The method according to claim 7, wherein a longitudinal acceleration of the motor vehicle is additionally taken into account when determining the compensating torque.

10. The method according to claim 7, wherein a torsional angle difference between a first torsional angle of the torque transmission assembly present when the locking element is fixed and a second torsional angle of the torque transmission assembly present before the locking element is released is used as the torsional angle.

11. The method according to claim 1, wherein a torsional pulse generator measuring a rotational speed of the wheel is used as the torsional pulse generator.

12. The method according to claim 11, wherein a longitudinal acceleration of the motor vehicle is additionally taken into account when determining the compensating torque.

13. The method according to claim 11, wherein a torsional angle difference between a first torsional angle of the torque transmission assembly present when the locking element is fixed and a second torsional angle of the torque transmission assembly present before the locking element is released is used as the torsional angle.

14. The method according to claim 1, wherein a longitudinal acceleration of the motor vehicle is additionally taken into account when determining the compensating torque.

15. The method according to claim 14, wherein a torsional angle difference between a first torsional angle of the torque transmission assembly present when the locking element is fixed and a second torsional angle of the torque transmission assembly present before the locking element is released is used as the torsional angle.

16. The method according to claim 1, wherein a torsional angle difference between a first torsional angle of the torque transmission assembly present when the locking element is fixed and a second torsional angle of the torque transmission assembly present before the locking element is released is used as the torsional angle.

17. The method according to claim 1, wherein the determination of the torsional angle is carried out from the fixing of the locking element until immediately before the release of the locking element.

18. The method according to claim 1, wherein the torsional angle is determined integrally from a signal of a torsional pulse generator and a longitudinal acceleration.

19. The method according to claim 1, wherein, when a control device carrying out the determination of the torsional angle is switched off with the locking element fixed, an instantaneous value of the torsional angle is stored and, when the control device is switched on, the determination of a holding angle is continued on the basis of the stored value.

20. A motor vehicle drive train device for a motor vehicle, which comprises a motor, connected at least temporarily to at least one wheel of the motor vehicle via a torque transmission assembly, and a park lock device, wherein the park lock device form-fittingly fixes a locking element coupled in a rotationally fixed manner to the torque transmission assembly in a first setting and releases it in a second setting and, when the park lock device is switched from the first setting to the second setting, a compensating torque is generated on the locking element by the motor, which counteracts a tensioning torque caused by tensioning of the torque transmission assembly when the locking element is fixed, wherein the motor vehicle drive train device is provided and configured to determine the compensating torque from a torsional angle of the torque transmission assembly determined after fixing of the locking element and a torsional stiffness of the torque transmission assembly.

* * * * *